(12) United States Patent
Marker, III et al.

(10) Patent No.: US 6,409,396 B1
(45) Date of Patent: Jun. 25, 2002

(54) INTERFERENCE FILTER HAVING A GLASS SUBSTRATE

(75) Inventors: Alexander J. Marker, III, Moscow; Sally Pucilowski, Luzerne; Joseph Hayden, Clarks Summit, all of PA (US)

(73) Assignee: Schott Glass Technologies, Inc., Duryea, PA (US)

( * ) Notice: Subject to any disclaimer, the term of this patent is extended or adjusted under 35 U.S.C. 154(b) by 0 days.

(21) Appl. No.: 09/917,220

(22) Filed: Jul. 30, 2001

Related U.S. Application Data

(60) Provisional application No. 60/222,597, filed on Aug. 2, 2000.

(51) Int. Cl.$^7$ .............................. G02B 6/36; C03C 3/16; C03C 4/10
(52) U.S. Cl. ........................... 385/88; 385/37; 385/123; 501/45; 501/47; 501/48
(58) Field of Search ................................ 385/88–94, 37, 385/49, 123; 359/127, 130, 161, 359, 360, 361, 584–589; 501/45–48, 73, 906, 905; 372/6

(56) References Cited

U.S. PATENT DOCUMENTS

| | | | |
|---|---|---|---|
| 4,105,577 A | * | 8/1978 | Yamashita |
| 5,036,025 A | * | 7/1991 | Lin .............................. 501/48 |
| 5,234,871 A | * | 8/1993 | Krashkevich ................. 501/73 |
| 5,262,364 A | | 11/1993 | Brow et al. |
| 5,508,235 A | | 4/1996 | Marker |
| 6,225,244 B1 | * | 5/2001 | Oguma ........................ 501/45 |

OTHER PUBLICATIONS

Veeco Process Equipment, Ion Tech, Inc., SPECTOR™ Flexible Turn–Key Ion Beam Deposition Systems for your All–Optical Network Solutions.

* cited by examiner

*Primary Examiner*—Hemang Sanghavi
(74) *Attorney, Agent, or Firm*—Millen, White, Zelano & Branigan, P.C.

(57) ABSTRACT

The present invention relates to a fiber optic system including a light source, a fiber optic transmission component, a receiver or transmitter of radiation, and an interference filter. The interference filter may include a glass substrate with at least two interference layers coated thereon. The glass substrate can include:

| Oxide | Range |
|---|---|
| $P_2O_5$ | 30–70 |
| $Al_2O_3$ | 5–15 |
| R'O | 5–15 |
| R' = Mg, Ca, Sr, Ba, Zn, Pb | |
| $R_2O$ R = Li, Na, K | 15–40 | where the glass substrate has a coefficient of, thermal expansion of $130-210 \times 10^{-7}/°$ C. at 30° C. to 70° C.

2 Claims, No Drawings

INTERFERENCE FILTER HAVING A GLASS SUBSTRATE

CROSS-REFERENCE TO RELATED APPLICATIONS

This application claims the benefit of U.S. Provisional Application No. 60/222,597 filed Aug. 2, 2000.

FIELD OF THE INVENTION

This invention generally relates to an interference filter having a glass substrate.

BACKGROUND OF THE INVENTION

Substrates that demand high expansion with good chemical durability are often manufactured from optical glasses. Optical glasses may be employed in various applications, such as substrates for interference filters used in fiber optic systems. Generally, these interference filters are fabricated from multiple layers of conducting and insulating materials or films that together result in a filter that passes only a narrow bandwidth of incident radiation. Such filters are described in *Optical Filter Design and Analysis-A Signal Processing Approach* by Christie K. Madsen and Jian H. Zhao published by John Wiley & Sons, 1999.

The thermal expansion value of a glass substrate can have important implications on device performance. As an example, a mismatch in thermal expansion between the glass substrate and a coating film can impose undue stress on the film. This stress can be calculated by the following formula:

$$\sigma = E_{film} \Delta \alpha \Delta T$$

where $E_{film}$ is the Young's modulus of the film, $\Delta \alpha$ is the mismatch in thermal expansion coefficient between the film and substrate, and $\Delta T$ is the shift in temperature from the preparation temperature of the film to the temperature of use, which is usually room temperature.

One solution is to prepare and maintain the film at the temperature of its intended use. However, transient stresses develop even for slight departures from the film creation temperature. Therefore, it is highly desirable to minimize the mismatch in thermal expansion between the film and the glass substrate.

In one particular application, there is a strong demand for a glass substrate capable of being incorporated into an interference filter for dense wave division (DWD) or dense wave division multiplexing (DWDM) applications. Such interference filters have high requirements in narrowing the bandwidth of light transmission with minimal drift of this property with change in temperature. These filters require bandwidths of less than 200 GHz pass frequency in the 1.5 µm wavelength region. Desirably, the substrate should be characterized by high transmission in the near IR where DWDM systems operate, i.e., wavelengths at or near 1.5 µm, and a refractive index value at 587.6 nm, ($n_d$) of 1.50 to 1.60. High transmission at 1.5 µm is characterized by a value of digital transmittance exceeding 88%.

It is also desired that such substrate glasses not contain primary colorants such as Mn, Co, Ni, V, Fe, Cr, and Cu, e.g., because they can impede transmission or not contain rare earth additives such as Er oxide or Nd oxide, which can have absorption bands in the visible or near-infrared regions of the electromagnetic spectrum, or not include CoO, $NiO_2$, FeO, $Fe_2O_3$ and CuO which can impede transmission in the near infrared region of the electromagnetic spectrum.

Furthermore, it would be desirable to manufacture an interference filter substrate economically. One such desirable process for making interference filter substrates from optical glasses is tank melting. In this case, refining agents such as arsenic oxide and antimony oxide are often used during the tank melting process to produce glass with high optical quality and low bubble content. However, often optical glass substrates contain cerium oxide. Cerium can form a solarization couple with either of these compounds, resulting in browning of the glass when it is exposed to short wavelength radiation. The glass browning can cause the loss in optical transmission. Consequently, glasses having cerium oxide would generally be undesirable for use as an interference filter substrate.

SUMMARY OF THE INVENTION

A desired embodiment of the invention is an interference filter for a fiber optic system including a substrate and a film coating the substrate. Typically, the substrate is coated with a series of layers of differing materials having properties, e.g., indices of refraction, producing interference effects achieving the desired wavelength transmission spectrum. Fiber optic systems comprise one or more light sources, fiber optic transmission components, a receiver of transmitted radiation, filters and end use components, e.g., detection, amplifiers, etc. In the prior art, it was desirable to have a glass substrate match the thermal expansion of a coating film. Surprisingly, it has been found that glass substrates having a thermal expansion much higher than that of the coatings applied to the substrate have significant and unexpected properties as a filter, such as having transmission characteristics independent of temperature. Generally, substrates having a coefficient of thermal expansion of about 130- about $210 \times 10^{-7}/°$ C.(−30° C. to +70° C.) are useful in this invention.

One exemplary embodiment of the present invention relates to a fiber optic system. The fiber optic system can include a light source, a fiber optic transmission component, a receiver or transmitter radiation, and an interference filter. The interference filter can include a glass substrate with at least two interference layers coated thereon. The glass substrate may include:

| Oxide | Range |
| --- | --- |
| $P_2O_5$ | 30–70 |
| $Al_2O_3$ | 5–15 |
| R'O | 5–15 |
| R' = Mg, Ca, Sr, Ba, Zn, Pb | |
| $R_2O$ R = Li, Na, K | 15–40 | and have the following properties:

| Measurement | Range |
| --- | --- |
| nd | 1.50–1.60 |
| Digital Transmittance at 1.5 µm | >88% |
| CTE (−30 to +70° C.) | 130–210 |

Another exemplary embodiment of the present invention relates to an interference filter having a glass substrate. The glass substrate may have at least two interference layers coated thereon. What is more, the interference filter glass substrate can include:

| Oxide | Range |
|---|---|
| $P_2O_5$ | 30–70 |
| $Al_2O_3$ | 5–15 |
| R'O | 5–15 |
| R' = Mg, Ca, Sr, Ba, Zn, Pb | |
| $R_2O$  R = Li, Na, K | 15–40 | and have the following properties:

| Measurement | Range |
|---|---|
| $n_d$ | 1.50–1.60 |
| Digital Transmittance at 1.5 μm | >88% |
| CTE (−30 to +70° C.) | 130–210 |

A still further exemplary embodiment of the present invention is a glass substrate. A glass substrate can include:

| Oxide | Range |
|---|---|
| $P_2O_5$ | 35–60 |
| $Al_2O_3$ | 10–14 |
| $R_2O$  R = Li, Na, K | 30–35 |
| $Li_2O$ | 0–3 |
| $Na_2O$ | 0–20 |
| $K_2O$ | 0–20 |
| R'O | 5–10 |
| R' = Mg, Ca, Sr, Ba, Zn, Pb | |
| $La_2O_3$ and/or $B_2O_3$ | 0–5 |

Furthermore, the glass substrate can have the following properties:

| Measurement | Range |
|---|---|
| nd | 1.50–1.60 |
| Digital Transmittance At 1.5 μm | >88% |
| CTE (−30 to +70° C.) | 130–210 |

An additional exemplary embodiment of the present invention relates to a method of making a fiber optic system. The method can include providing an interference filter having a glass substrate including:

| Oxide | Range |
|---|---|
| $P_2O_5$ | 30–70 |
| $Al_2O_3$ | 5–15 |
| R'O | 5–15 |
| R' = Mg, Ca, Sr, Ba, Zn, Pb | |
| $R_2O$  R = Li, Na, K | 15–40 |

Still another exemplary embodiment of the present invention relates to a method of passing light through an interference filter. The method can include passing light through an interference filter having a glass substrate including:

| Oxide | Range |
|---|---|
| $P_2O_5$ | 30–70 |
| $Al_2O_3$ | 5–15 |
| R'O | 5–15 |
| R' = Mg, Ca, Sr, Ba, Zn, Pb | |
| $R_2O$  R = Li, Na, K | 15–40 |

What is more, the passed light can be transmitted through a fiber optic transmission component.

Several properties are important for the substrates of such filters, especially interference filter components. These properties include, especially, coefficient of thermal expansion and refractive index at 587.6 nm, ($n_d$), and high digital transmittance at 1.5 μm. As depicted below in Table 1, glass substrates of the present invention desirably have the following properties in order to provide useful substrates for interference filters:

TABLE 1

| Measurement | General Range | Preferred Range | Optimal Range |
|---|---|---|---|
| $n_d$ (587.6 nm) | 1.50–1.60 | 1.52–1.58 | 1.54–1.56 |
| Digital Transmittance at 1.5 μm | >88% | >89% | >90% |
| CTE (−30 to +70° C.) | 130–210 | 135–200 | 140–180 |

Glasses which achieve these properties include (in mol%)

TABLE 2

| | Mol % | | |
|---|---|---|---|
| Oxide | General Range | Preferred Range | Optimal Range |
| $P_2O_5$ | 30–70 | 35–65 | 35–60 |
| $Al_2O_3$ | 5–15 | 7–14 | 10–14 |
| $R_2O$ (R = Li, Na, K) | 15–40 | 25–35 | 30–35 |
| $Li_2O$ | 0–20 | 0–12 | 0–3 |
| $Na_2O$ | 0–30 | 0–25 | 0–20 |
| $K_2O$ | 0–30 | 0–25 | 0–20 |
| R'O | 5–15 | 5–12 | 5–10 |
| R' = Mg, Ca, Sr, Ba, Zn, Pb | | | |
| $La_2O_3$ and/or $B_2O_3$ | 0–10 | 0–8 | 0–5 |

These glasses are essentially free of $Fe_2O_3$ and other additives that would restrict transmission at telecommunicating wavelengths, i.e., in the near IR, at or near 1.5 μm. Optionally, these glasses also include:

| | Mol % | | |
|---|---|---|---|
| Oxide | General Range | Preferred Range | Optimal Range |
| ZnO | 0–10 | 0–8 | 0–5 |
| $TiO_2$ | 0–10 | 0–8 | 0–5 |
| $ZrO_2$ | 0–10 | 0–8 | 0–5 |
| $MoO_3$ | 0–10 | 0–8 | 0–5 |
| $Ta_2O_5$ | 0–10 | 0–8 | 0–5 |
| $WO_3$ | 0–10 | 0–8 | 0–5 |
| $In_2O_3$ | 0–10 | 0–8 | 0–5 |
| $Y_2O_3$ | 0–8 | 0–5 | 0–5 |

These $P_2O_5$ substrates of the present invention maybe made by conventional glass melting techniques. Raw materials can be melted in platinum crucibles and aired at temperatures around 1200° C. for up to five hours.

The interference filter for a fiber optic system also includes at least one film desirably in the form of a layer. Such films can be selected from $SiO_2$, $Ta_2O_5$, $HfO_2$, etc. These can be applied by commercially available standard ion beam deposition systems such as the SPECTOR™ system available from Ion Tech, Inc. of Fort Collins, Colo., and other known methods. In addition to being particularly useful for DWDM filters, these glasses are also exceptionally useful as high expansion glasses for fabrication of hybrid structures that demand a high expansion glass with good chemical durability, e.g., for the purposes of longwave pass filters, polarizing components, band pass filters, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following example, all temperatures are set forth uncorrected in degrees Celsius; and, unless otherwise indicated, all parts and percentages are by mole based on oxide.

The entire disclosures of all applications, patents and publications, cited above or below are hereby incorporated by reference.

An exemplary glass substrate prepared by methods of the present invention is presented in Table 3 below:

TABLE 3

| Oxide | Mol % |
| --- | --- |
| $P_2O_5$ | 40 |
| $Al_2O_3$ | 12 |
| $Na_2O$ | 15 |
| $K_2O$ | 18 |
| PbO | 9 |
| $B_2O_3$ | 6 |
| Property | Value |
| $n_d$ (587.6 nm) | 1.549 |
| Digital Transmittance at 1.5 µm | 91% |
| CTE (−30 to +70° C.) | 150.4 × $10^{-7}$/C |

Thermal expansion coefficients of the glass compositions, determined by dilatometry were calculated from the total glass expansion measured from room temperature just below the glass transition temperature.

The preceding example can be repeated with similar success by substituting the generically or specifically described reactants and/or operating conditions of this invention for those used in the preceding example.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A fiber optic system, comprising:

a light source;

a fiber optic transmission component;

a receiver or transmitter of radiation; and an interference filter, comprising a glass substrate with at least two interference layers coated thereon; wherein the glass substrate comprises:

| Oxide | Weight Percent Based on Oxide |
| --- | --- |
| $P_2O_5$ | 30–70 |
| $Al_2O_3$ | 5–15 |
| R'O | 5–15 |
| R' = Mg, Ca, Sr, Ba, Zn, Pb | |
| $R_2O$  R = Li, Na, K | 15–40 | and wherein the glass substrate has a coefficient of thermal expansion of 130–210×$10^{-7}$/° C. at 30° C. to 70° C.

2. A fiber optic system, comprising:

a light source;

a fiber optic transmission component;

a receiver or transmitter of radiation; and an interference filter, comprising a glass substrate with at least two interference layers coated thereon; wherein the glass substrate is made by adding together and melting:

| Oxide | Weight Percent |
| --- | --- |
| $P_2O_5$ | 30–70 |
| $Al_2O_3$ | 5–15 |
| R'O | 5–15 |
| R' = Mg, Ca, Sr, Ba, Zn, Pb | |
| $R_2O$  R = Li, Na, K | 15–40 | and wherein the glass substrate has a coefficient of thermal expansion of 130–210×$10^{-7}$/° C. at 30° C. to 70° C.

* * * * *